(12) United States Patent
Tomita et al.

(10) Patent No.: US 8,532,018 B2
(45) Date of Patent: Sep. 10, 2013

(54) SYSTEM, METHOD, BASE STATION APPARATUS, AND TERMINAL APPARATUS FOR MOBILE COMMUNICATION

(75) Inventors: Tetsuo Tomita, Kawasaki (JP); Takashi Sonobe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 12/913,342

(22) Filed: Oct. 27, 2010

(65) Prior Publication Data

US 2011/0038298 A1    Feb. 17, 2011

Related U.S. Application Data

(63) Continuation of application No. PCT/JP2008/058672, filed on May 9, 2008.

(51) Int. Cl.
*H04J 3/00* (2006.01)
*H04W 4/00* (2009.01)

(52) U.S. Cl.
USPC ............ 370/326; 370/330; 370/336; 370/345

(58) Field of Classification Search
USPC .................. 370/312, 321, 329–330, 337, 345, 370/347, 349, 390, 432, 436–437, 442, 464–465, 370/468–469, 473, 478, 498
See application file for complete search history.

(56) References Cited

U.S. PATENT DOCUMENTS

| | | | |
|---|---|---|---|
| 7,961,699 B2 * | 6/2011 | Morimoto et al. ............ 370/344 |
| 8,200,252 B2 * | 6/2012 | Lee et al. ...................... 455/458 |
| 8,213,348 B2 * | 7/2012 | Ai ................................. 370/312 |
| 8,385,246 B2 * | 2/2013 | Sawahashi et al. ........... 370/312 |
| 2003/0145064 A1 | 7/2003 | Hsu et al. |
| 2003/0194992 A1 | 10/2003 | Kim et al. |
| 2005/0120097 A1 * | 6/2005 | Walton et al. ................. 709/220 |
| 2008/0101411 A1 * | 5/2008 | Takahashi et al. ............ 370/473 |
| 2009/0086670 A1 * | 4/2009 | Hart et al. ..................... 370/329 |
| 2011/0103366 A1 * | 5/2011 | Morimoto et al. ............ 370/344 |

FOREIGN PATENT DOCUMENTS

| | | |
|---|---|---|
| JP | 2004-040770 | 5/2004 |
| JP | 2005-516534 | 6/2005 |
| JP | 2006-121396 | 5/2006 |
| JP | 2006-166317 | 6/2006 |
| JP | 2007-513571 | 5/2007 |

OTHER PUBLICATIONS

International Search Report issued for corresponding International Patent Application No. PCT/JP2008/058672, mailed Jul. 15, 2008.

* cited by examiner

*Primary Examiner* — Tri H Phan
(74) *Attorney, Agent, or Firm* — Myers Wolin, LLC

(57) ABSTRACT

A mobile communication system includes a data multiplexer which divides by time a radio frame of a communication channel in a radio layer and multiplexes one of a plurality of pieces of multicast data and a plurality of pieces of broadcast data into the divided radio frames; and a data multiplex demultiplexer which demultiplexes, when receiving one of the plurality of pieces of multicast data and the plurality of pieces of broadcast data multiplexed by the data multiplexer, the multiplexing of the received data.

14 Claims, 14 Drawing Sheets

COMMUNICATION CHANNEL NUMBER
(IDENTIFIER) FOR MBMS

| MBMS ID (4 BITS) | SERVICE |
|---|---|
| 0000 | MBMS #1 |
| 0001 | MBMS #2 |
| 0010 | MBMS #3 |
| ... | ... |
| 1101 | MBMS #14 |
| 1110 | MBMS #15 |
| 1111 | NOT IN USE (RESERVATION FOR FUTURE) |

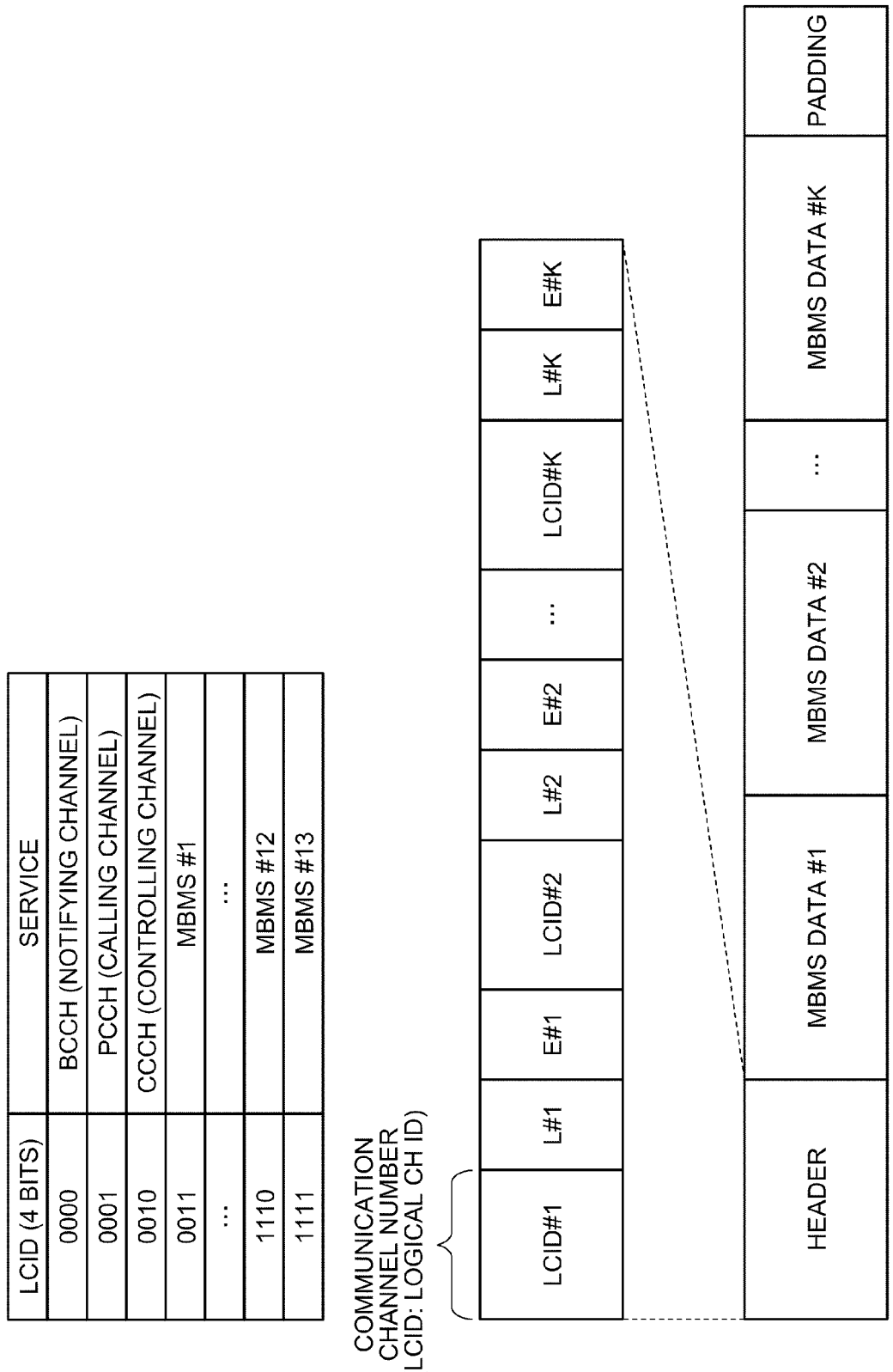

US 8,532,018 B2

SYSTEM, METHOD, BASE STATION APPARATUS, AND TERMINAL APPARATUS FOR MOBILE COMMUNICATION

CROSS-REFERENCE TO RELATED APPLICATION

This application is a continuation of PCT International Application Serial No. PCT/JP2008/058672 filed on May 9, 2008, now pending, the contents of which are herein wholly incorporated by reference.

FIELD

The embodiments discussed herein are directed to a mobile communication base station apparatus; a mobile communication terminal apparatus; a mobile communication system which broadcasts and distributes content from the mobile communication base station apparatus to the mobile communication terminal apparatus via a radio communication; and a mobile communication method in which content is broadcasted and distributed from the mobile communication base station apparatus to the mobile communication terminal apparatus via a radio communication.

BACKGROUND

In recent years, a multimedia broadcast and multicast service in which data of content such as a music and an image are distributed from a data distributing device to a fixed terminal device has been used widely in a fixed terminal communication in a wired network. A broadcast communication in the fixed terminal communication is called "multichannel broadcasting" because a desired content can be selectively viewed among a lot of channels.

At the same time, a fusion of the fixed terminal communication and a mobile terminal communication called "fixed mobile convergence (FMC)" has been promoted. Moreover, a fusion of the fixed terminal communication, the mobile terminal communication, and a broadcast communication called "fixed mobile broadcast convergence (FMBC)" has been encouraged. In the context of such circumstances, the multimedia broadcast and multicast service (hereinafter abbreviated and referred to as "MBMS") in which data of content such as music and images are distributed has been provided also in the mobile terminal communication, similarly to the fixed terminal communication.

However, the conventional technique has the following problems. Since a resource expansion is easy in the fixed terminal communication, the multichannel broadcasting can be easily achieved. On the other hand, limited radio resources are used to perform a communication between a mobile terminal and a base station in the MBMS in the mobile terminal communication. Therefore, there has been a problem that multichannel broadcasting in the number of channels over the number of the limited radio resources cannot be achieved and the number of channels is subjected to a limitation.

To prepare a lot of communication channels in the MBMS, a lot of radio resources (frequency and channelization code) for the number of communication channels come to be required. However, since the radio resources are limited, there has been a problem that an occupation of a majority of the radio resources for the MBMS weighs on radio resources to be used by a user for a normal verbal communication and a data transmission/reception and thereby a capacity in the number of users is decreased. More detailed information of the conventional technique as described above can be obtained in Japanese Laid-open Patent Publication No. 2004-40770.

SUMMARY

According to an aspect of an embodiment of the invention, a mobile communication system includes a data multiplexer that divides by time a radio frame of a communication channel in a radio layer and multiplexes one of a plurality of pieces of multicast data and a plurality of pieces of broadcast data into the divided radio frames; and a data demultiplexer that demultiplexes the received multiplexed data upon receiving one of the plurality of pieces of multicast data and the plurality of pieces of broadcast data multiplexed by the data multiplexer.

According to another aspect of an embodiment of the invention, a mobile communication terminal apparatus includes a service determination notifying unit that determines a service of one of a plurality of pieces of multicast data and a plurality of pieces of broadcast data based on schedule information of data multiplexing notified from a mobile communication base station apparatus; a service identifying unit that identifies a corresponding service based on identifying information, notified from the mobile communication base station apparatus, of the service corresponding to one of the plurality of pieces of multicast data and the plurality of pieces of broadcast data; a communication channel identifying unit that identifies a corresponding communication channel based on identifying information, notified from the mobile communication base station apparatus, of the communication channel corresponding to one of the plurality of pieces of multicast data and the plurality of pieces of broadcast data; and a data demultiplexer that demultiplexes one of the plurality of pieces of multicast data and the plurality of pieces of broadcast data based on a result of the service identification by the service identifying unit and on a result of the communication channel identification by the communication channel identifying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11B is a view for explaining a protocol format of a communication channel in a 3.5th-generation mobile communication system;

DESCRIPTION OF EMBODIMENTS

Preferred embodiments of the present invention will be explained in detail below with reference to accompanying drawings. Here, a mobile communication system in which a cell-phone unit is adopted as a mobile communication terminal apparatus is explained in embodiments to be disclosed below.

However, the present invention is not limited to the above description and may be any communication systems as long as data such as content can be transmitted and received therein via a radio communication. For example, a communication system which uses a personal handyphone system (PHS), a personal digital assistants (PDA), a radio local area network (LAN) communication device, a Bluetooth (registered trademark) communication device, an infrared data communication device, and the like may be adopted.

Figure 11A:
FIG. 11A is a view for explaining a protocol format of a communication channel in a 3rd-generation mobile communication system.

Prior to an explanation of embodiments, the problems which make multichannelization in MBMSs difficult in the conventional technique will be explained with reference to FIGS. 11A to 12B. FIG. 11A is a view for explaining a protocol format of a communication channel in the 3rd-generation mobile communication system. FIG. 11B is a view for explaining a protocol format of a communication channel in the 3.5th-generation mobile communication system.

Referring to FIG. 11A, a frame of a communication channel in the 3rd-generation mobile communication system includes respective fields for a "channel type" which indicates a type of a channel of the frame, an "MBMS ID" which is a communication channel number (identifier) for MBMS, and "MBMS data" which is provided in MBMS.

As illustrated in FIG. 11A, when one reservation bit sequence for one channel type is to be secured in the MBMS ID, fifteen MBMSs (MBMS #1 to MBMS #15) can be allocated since the MBMS ID is information expressed by four binary digits. MBMS data corresponding to each MBMS ID is to be stored in the field of "MBMS DATA".

Referring to FIG. 11B, a frame of a communication channel in the 3.5th-generation mobile communication system includes respective fields for "HEADER", "MBMS DATA #0", . . . "MBMS DATA #K" ("K" is a positive integer satisfying 1≦K) each of which stores corresponding MBMS data, and "PADDING" in which zero-padding is performed on a part not reaching a specified number of bites of the frame.

In addition, the "HEADER" includes "LCID #1" which is an abbreviation for a logical channel ID and indicates a communication channel number #0, an "L #1" which indicates a head position of data corresponding to the "LCID #1", and an "E #1" which is a reservation field as illustrated in FIG. 11B. The "HEADER" has a structure in which a set of the communication channel number, the head position of data corresponding to the communication channel number, and the reservation field is iterated "K" times.

As illustrated in FIG. 11B, when three specific-purpose channels for one LCID are to be allocated preferentially for example, thirteen MBMSs (MBMS #1 to MBMS #13) can be allocated since each LCID is information expressed by four binary digits. For example, MBMS data of the MBMS #1 to MBMS #13 for the LCID #1 is to be stored in "MBMS DATA #0".

Based on the explanation with reference to FIGS. 11A and 11B above, it is understood that there is a limit in the number of MBMSs to be multiplexed into and allocated in one communication channel in the 3rd-generation and the 3.5th-generation mobile communication systems.

Figure 12A:
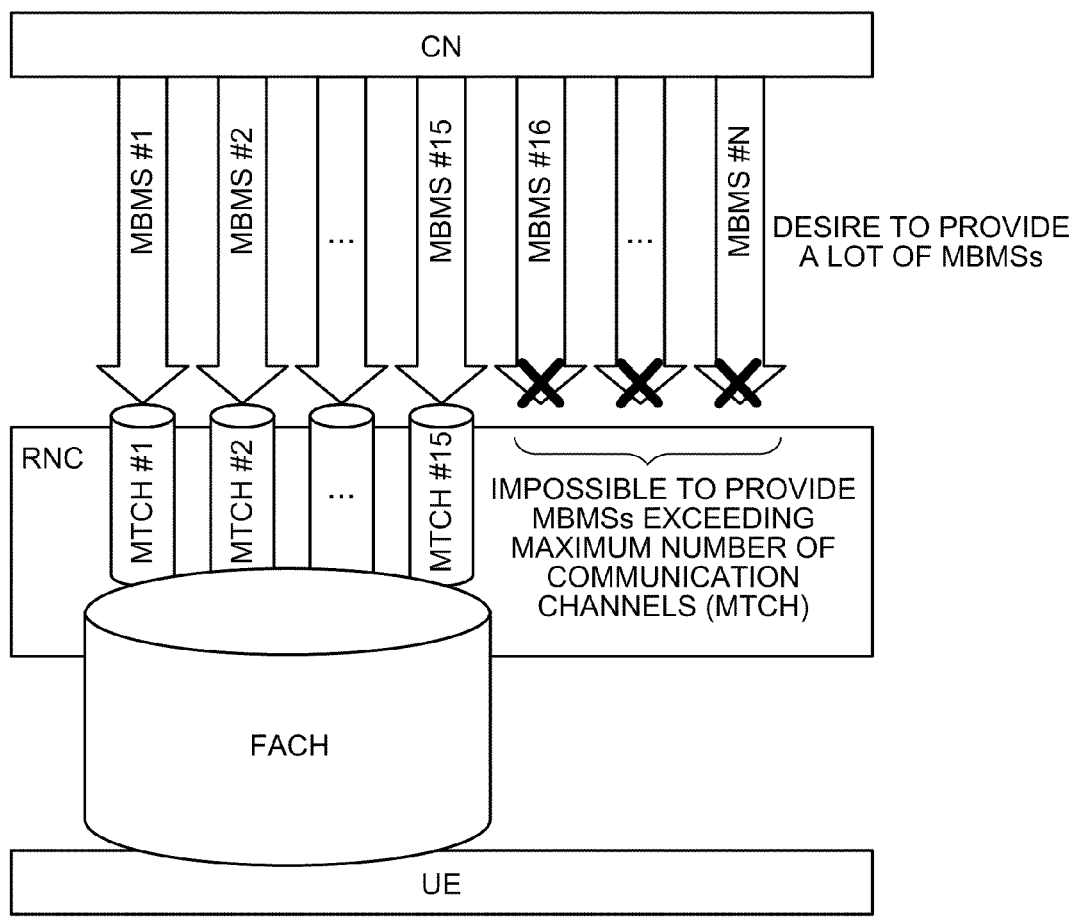
FIG. 12A is a view for explaining a problem (first problem) in providing MBMSs in the 3rd-generation and the 3.5th-generation mobile communication systems.
Figure 12B:
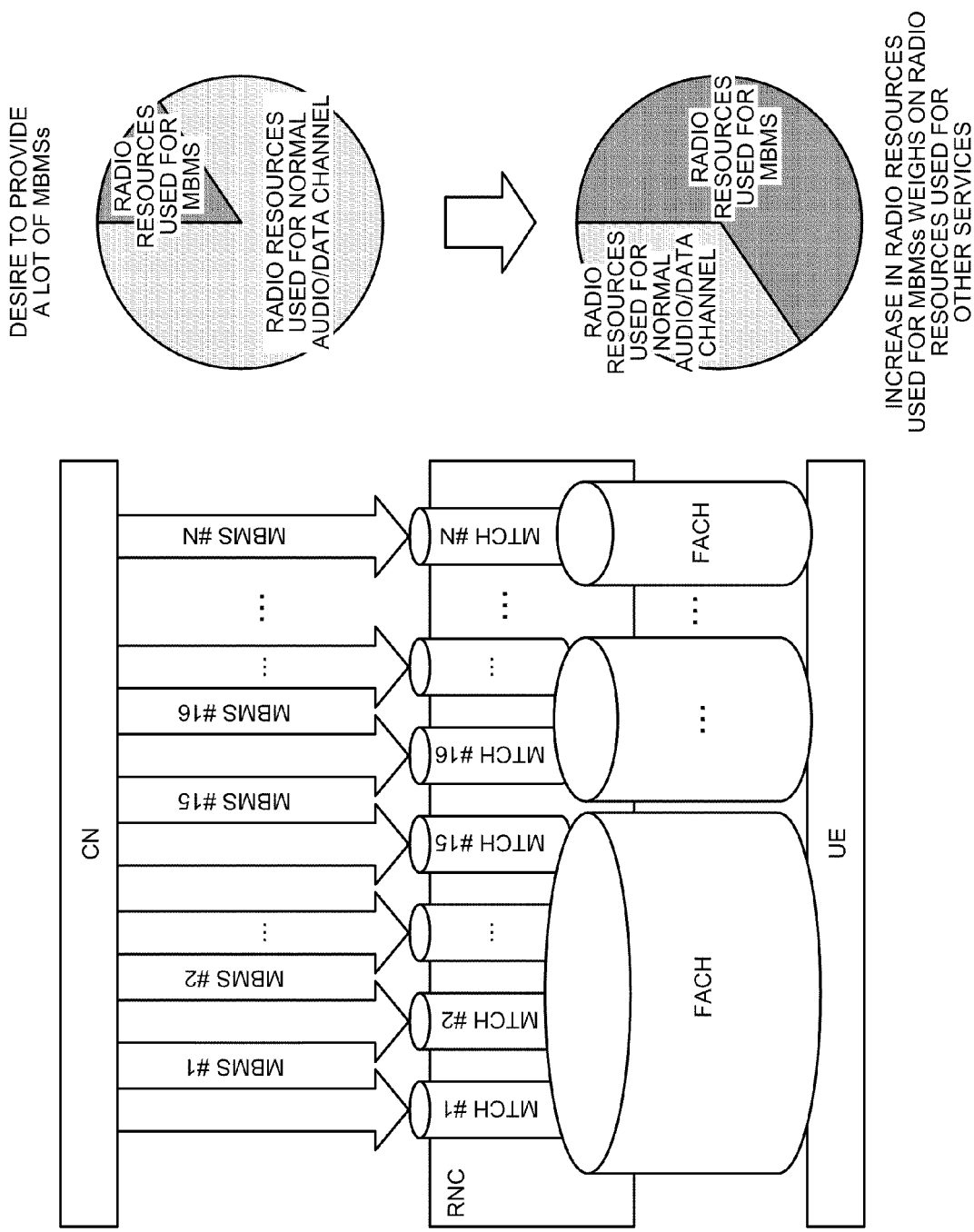
FIG. 12B is a view for explaining another problem (second problem) in providing MBMSs in the 3rd-generation and the 3.5th-generation mobile communication systems.

FIG. 12A is a view for explaining a problem (first problem) in providing MBMSs in the 3rd-generation and the 3.5th-generation mobile communication systems. FIG. 12B is a view for explaining another problem (second problem) in providing MBMSs in the 3rd-generation and the 3.5th-generation mobile communication systems.

FIG. 12A is based on an assumption of a case of providing MBMSs from an MBMS #1 to an MBMS #N (N is a positive integer satisfying 16≦N, for example) from a core network (hereinafter abbreviated and referred to as "CN"). However, a radio network controller (which is a radio controller in a mobile communication base station and hereinafter abbreviated and referred to as "RNC") only has fifteen communication channels, more specifically, fifteen point-to-multicast traffic channels (hereinafter abbreviated and referred to as "MTCH #1 to MTCH #15").

Therefore, the number of MBMSs which can be transmitted to user equipment (hereinafter abbreviated and referred to as "UE") such as a user cell-phone terminal device by using a forward access channel (which is a radio resource and hereinafter abbreviated and referred to as "FACH") is limited to fifteen at a maximum. In other words, there has been a problem that fifteen channels can only be secured even in realizing the multichannelization in MBMSs.

Similarly, FIG. 12B is based on an assumption of a case of providing MBMSs from the MBMS #1 to the MBMS #N (N is a positive integer satisfying 15<N, for example) from the CN. The RNC uses FACH holding fifteen MTCHs (MTCH #1 to MTCH #15) to transmit MBMSs #1 to #15 to the UE.

Here, when MBMSs of which the number is "N" are transmitted from the CN to the UE, more MTCH of the RNC is to be used (MTCH #16 to MTCH #N).

Since radio resources are limited and each MTCH is related to a corresponding FACH, a lot of radio resources are occupied for MBMSs in trying to provide more MBMSs to the UE and radio resources usable for a normal verbal communication and data communication are to be weighed on inevitably. Thus, the number of cell-phone terminal devices which can be held by the RNC is reduced, thereby significantly affecting a convenience of the mobile communication system.

In embodiments, MBMSs of which the number exceeding the number of communication channels for MBMS can be provided without excessively increasing the number of communication channels while maintaining, irrespective of a limit in the number of communication channels, a protocol format of an MBMS technology. In other words, multichannelization in MBMSs can be achieved without reducing the number of cell-phone terminal devices which can be held by the RNC and affecting a convenience of the mobile communication system.

[a] First Embodiment

Figure 1:
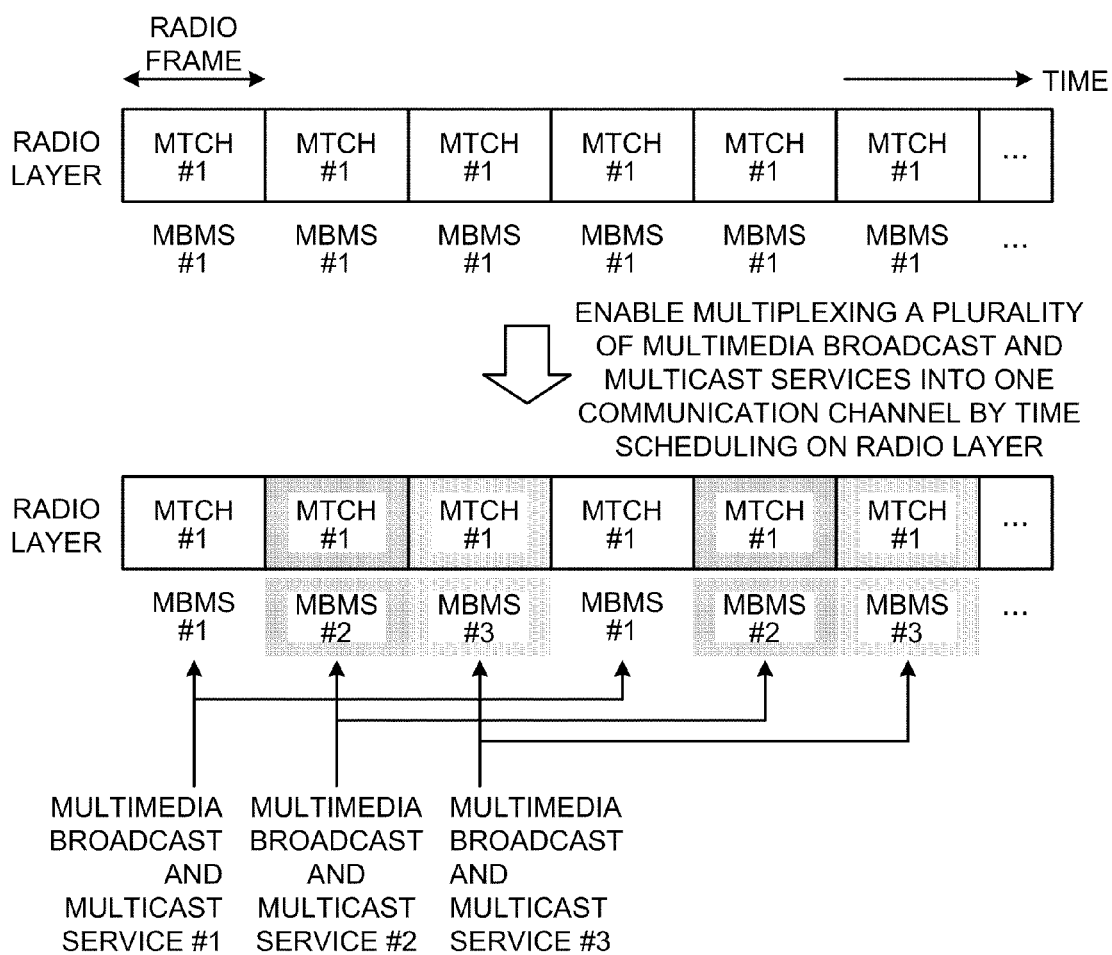
FIG. 1 is a view for explaining a situation of multiplexing multimedia broadcast and multicast services (MBMSs) into one communication channel by an L1 scheduling in a mobile communication system according to a first embodiment.

A first embodiment will be disclosed below with reference to FIGS. 1 to 11. First of all, a situation of multiplexing MBMSs to one communication channel by an L1 scheduling in a mobile communication system according to a first embodiment will be explained. FIG. 1 is a view for explaining the situation.

Referring to FIG. 1, a time-division multiplex of a plurality of multimedia broadcast and multicast services (MBMSs) is realized in one communication channel (MTCH) by performing a time scheduling on a radio layer (MTCH) (hereinafter the time scheduling is referred to as an "L1 scheduling" since the radio layer is equivalent to a layer 1) in a mobile communication base station or a radio network controller (RNC) (hereinafter the mobile communication base station and the radio network controller are collectively referred to as a "mobile communication base station apparatus") in the first embodiment.

As illustrated in FIG. 1, data of MBMSs #1, #2, and #3 are, for example, repetitively stored in this order in successive frames of an MTCH #1 on the radio layer, instead of storing data of MBMS #1. By this, three MBMSs #1 to #3 can be multiplexed into the MTCH #1 and a triple channelization can be achieved without increasing radio resources.

Figure 2:
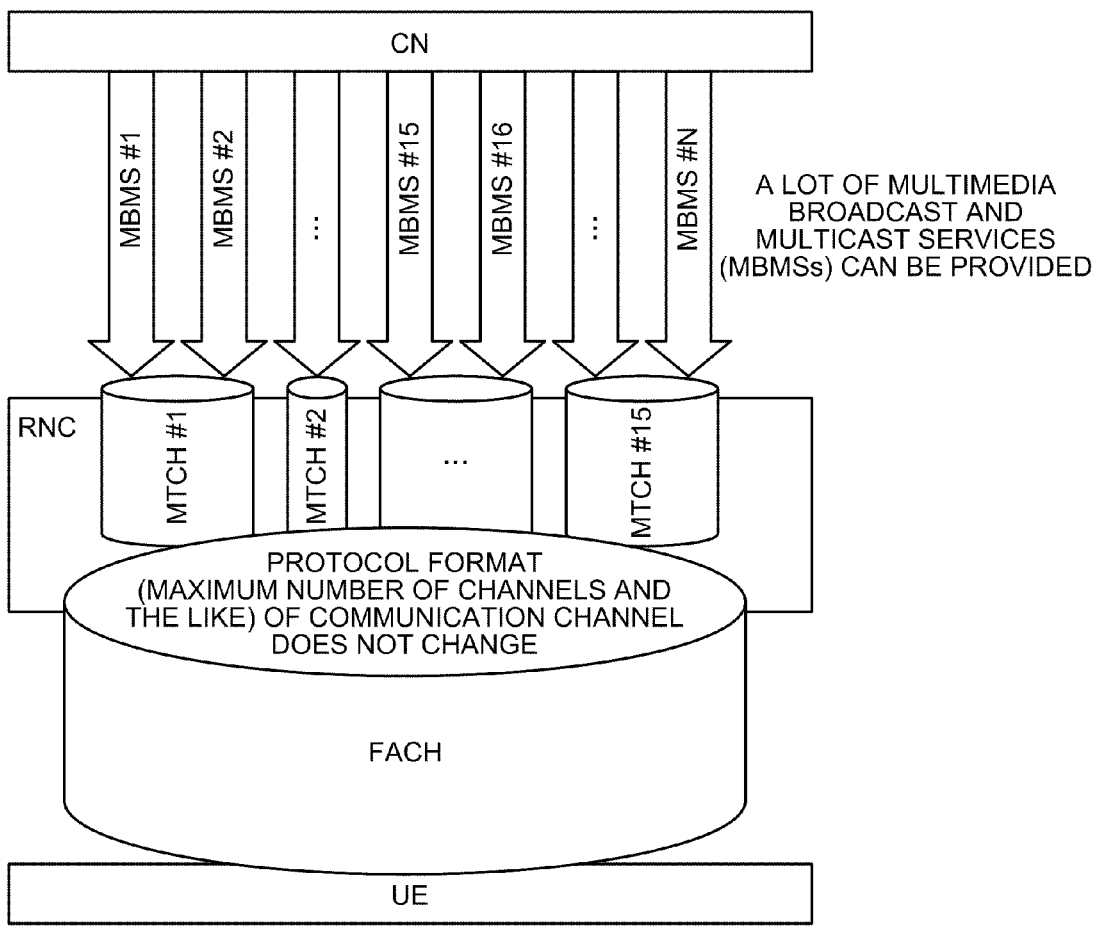
FIG. 2 is a view explaining a method for realizing a provision of MBMSs in the mobile communication system according to the first embodiment.

In this manner, even when the maximum number of MTCHs is fifteen from MTCH #1 to MTCH #15 as illustrated in FIG. 2 for example, data of MBMSs exceeding fifteen can be transmitted from the CN to the UE, in other words, multichannelization in MBMSs can be realized by the time-division multiplex of a plurality of MBMSs into one MTCH without changing a protocol format (the maximum number of channels and the like) of a communication channel.

Figure 3:
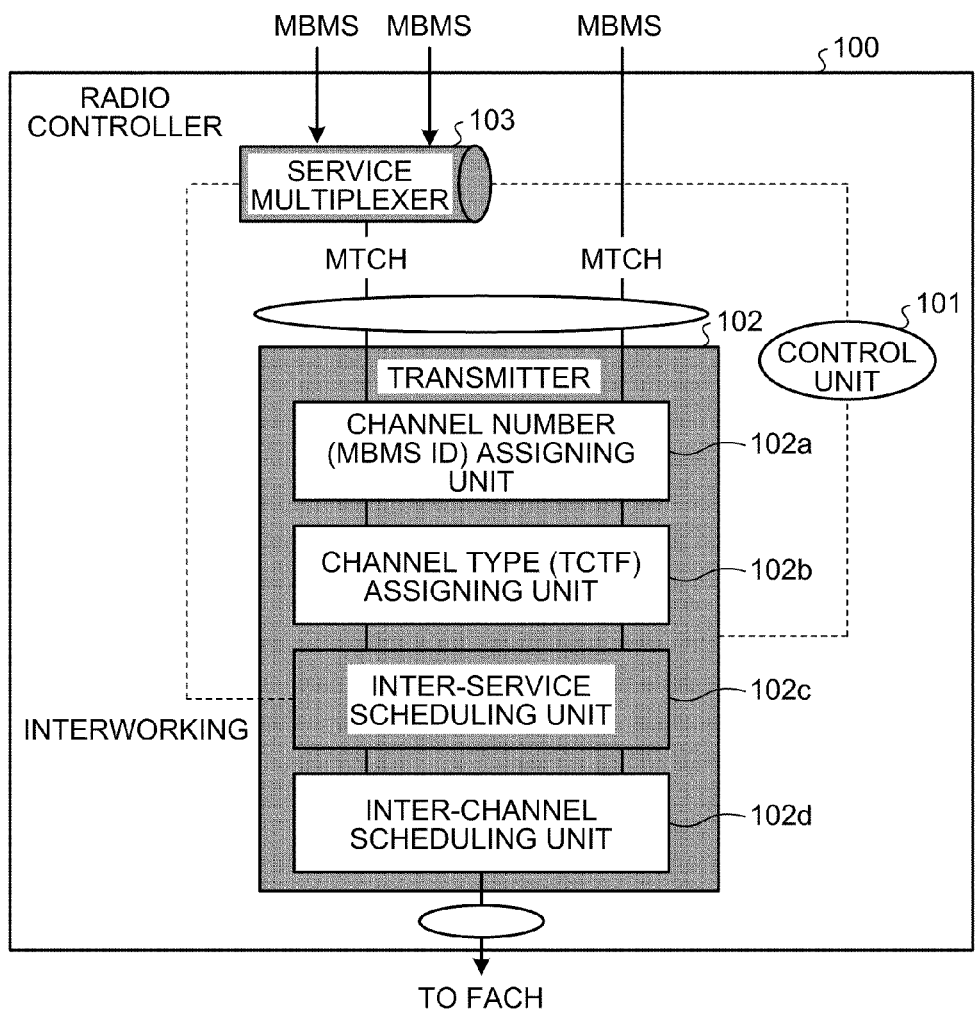
FIG. 3 is a functional block diagram of a configuration of a radio controller in a mobile communication base station according to the first embodiment.

Next, a configuration of a radio controller in a mobile communication base station according to the first embodiment will be explained. FIG. 3 is a functional block diagram of the configuration. In FIG. 3, configurations and functions of only parts related to the first embodiment will be explained.

As illustrated in FIG. 3, a configuration of a radio controller 100 according to the first embodiment is provided with a control unit 101, a transmitter 102, and a service multiplexer 103. Here, the control unit 101, the transmitter 102, and the service multiplexer 103 are connected and interwork with each other.

The control unit 101 performs controls of other functional units, such as setting and releasing communication channel for MBMS upon a start and an end of an MBMS. Besides, the control unit 101 has a function of determining what MBMSs are to be multiplexed and additionally a function of determining L1 scheduling information of each of the multiplexed MBMSs.

As a method of determining L1 scheduling information of each MBMS in the control unit 101, the information is, for example, configured to be determined based on a communication band necessary for each MBMS. When an MBMS requiring a communication rate of 1 Mbps is to be arranged for multiplex with respect to a communication channel of 10 Mbps for example, one radio frame out of ten radio frames of the communication channel (MTCH) is configured to be allocated to the MBMS since 10 Mbps divided by 1 Mbps equals to one tenth.

Figure 4:
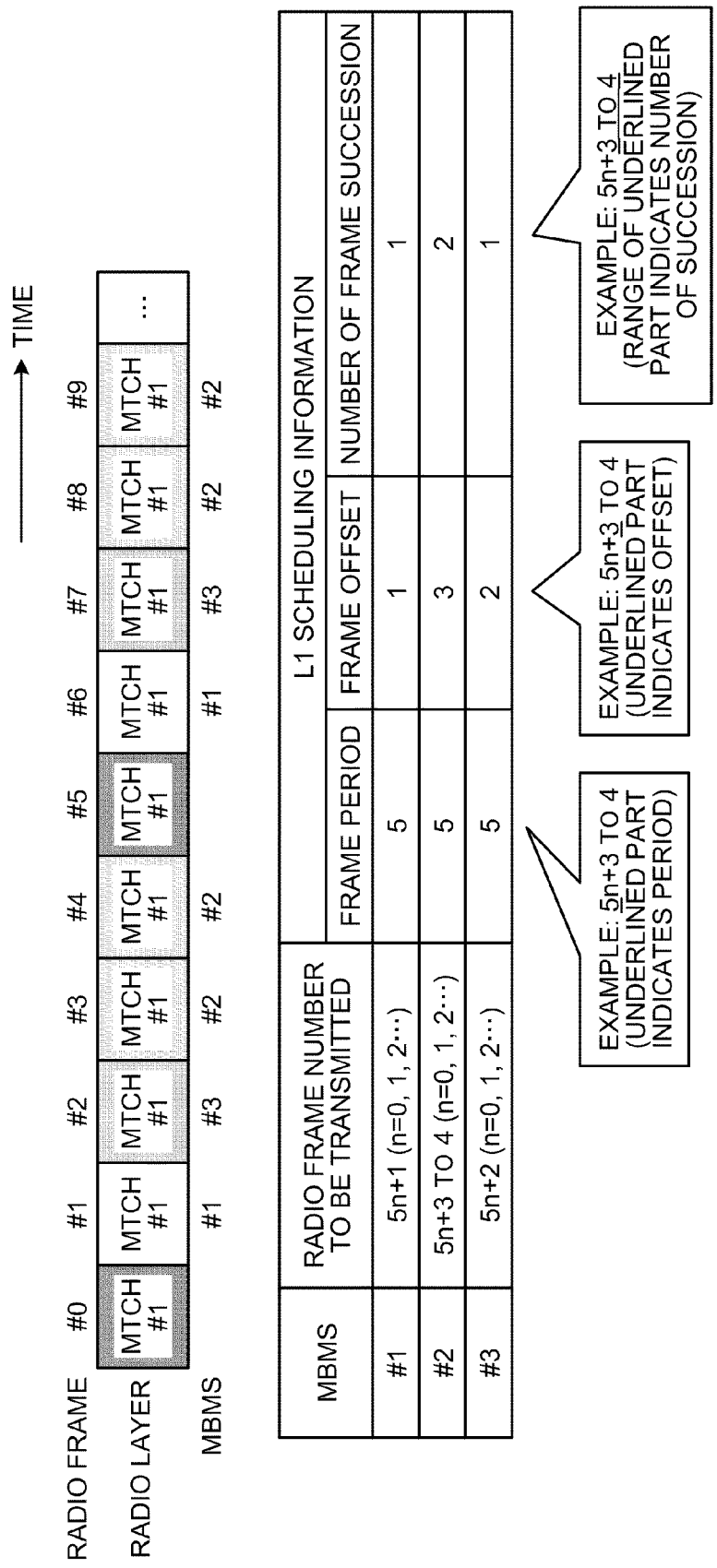
FIG. 4 is a view for explaining a method of multiplexing MBMSs into a single communication channel by the L1 scheduling performed by the radio controller in the mobile communication base station according to the first embodiment.

Here, the L1 scheduling information includes three parameters of a frame period, a frame offset, and the number of frame succession as illustrated in FIG. 4. The frame period is a parameter indicating a period of a radio frame which transmits a corresponding MBMS on a radio channel.

The frame offset is a parameter indicating an offset at a radio frame position from which a transmission of a corresponding MBMS is started in each frame period. The number of frame succession is a parameter indicating a radio frame range of transmitting a corresponding MBMS in each frame period.

As illustrated in FIG. 4, an MBMS #1 is in a radio frame to be transmitted which has a radio frame number expressed in a form of "5n+1 (n=0, 1, ...)", for example. The numeral "5" in "5n+1" is the frame period and the numeral "1" is the frame offset. Then, the number of frame succession is "1".

Besides, an MBMS #2 is in a radio frame to be transmitted which has a radio frame number expressed in a form of "5n+3, 4 (n=0, 1, ...)", for example as illustrated in FIG. 4. The numeral "5" in "5n+3, 4" is the frame period and the numeral "3" is the frame offset. Then, the number of frame succession is "2" since the expression "5n+3, 4" means both "5n+3" and "5n+4".

Besides, an MBMS #3 is in a radio frame to be transmitted which has a radio frame number expressed in a form of "5n+2 (n=0, 1, ...)", for example as illustrated in FIG. 4. The numeral "5" in "5n+2" is the frame period and the numeral "2" is the frame offset. Then, the number of frame succession is "1".

By following the L1 scheduling information defined in this manner, the MBMS #1 is arranged in a radio frame #1, the MBMS #3 is arranged in a radio frame #2, and the MBMS #2 is arranged in radio frames #3 and #4 among radio frames #0 to #9.

In addition, the MBMS #1 is arranged in a radio frame #6, the MBMS #3 is arranged in a radio frame #7, and the MBS #2 is arranged in radio frames #8 and #9. In this manner, a plurality of MBMSs can be multiplexed into one communication channel.

Referring back to FIG. 3, the transmitter 102 is provided with a channel number (MBMS ID) assigning unit 102*a*, a channel type (TCTF) assigning unit 102*b*, an inter-service scheduling unit 102*c*, and an inter-channel scheduling unit 102*d*.

The channel number assigning unit 102*a* and the channel type assigning unit 102*b* respectively assign a channel number (MBMS ID) and a channel type (TCTF) to the MBMS data according to a protocol format of each MBMS technology.

The inter-service scheduling unit 102*c* schedules the MBMS data transmitted from a communication channel (MTCH) based on the L1 scheduling information, instructed by the control unit 101, of each MBMS.

The inter-service scheduling unit 102*c* determines what MBMS data the transmitted MBMS data is in cooperation with the service multiplexer 103. Then, the inter-service scheduling unit 102c schedules the MBSM data at a timing of a radio transmission based on the L1 scheduling information of the corresponding MBMS.

The inter-channel scheduling unit 102d performs a scheduling among communication channels (MTCHs). Here, the channel number assigning unit 102a, the channel type assigning unit 102b, and the inter-channel scheduling unit 102d each have a similar function to the conventional technique.

The service multiplexer 103 performs a process of multiplexing data of MBMSs into a communication channel (MTCH) based on a correspondence relation between each MBMS instructed by the control unit 101 and the communication channel (MTCH). On this occasion, the service multiplexer 103 notifies what MBMS data the transmitted MBMS data after multiplex is to the inter-service scheduling unit 102c.

Figure 5:
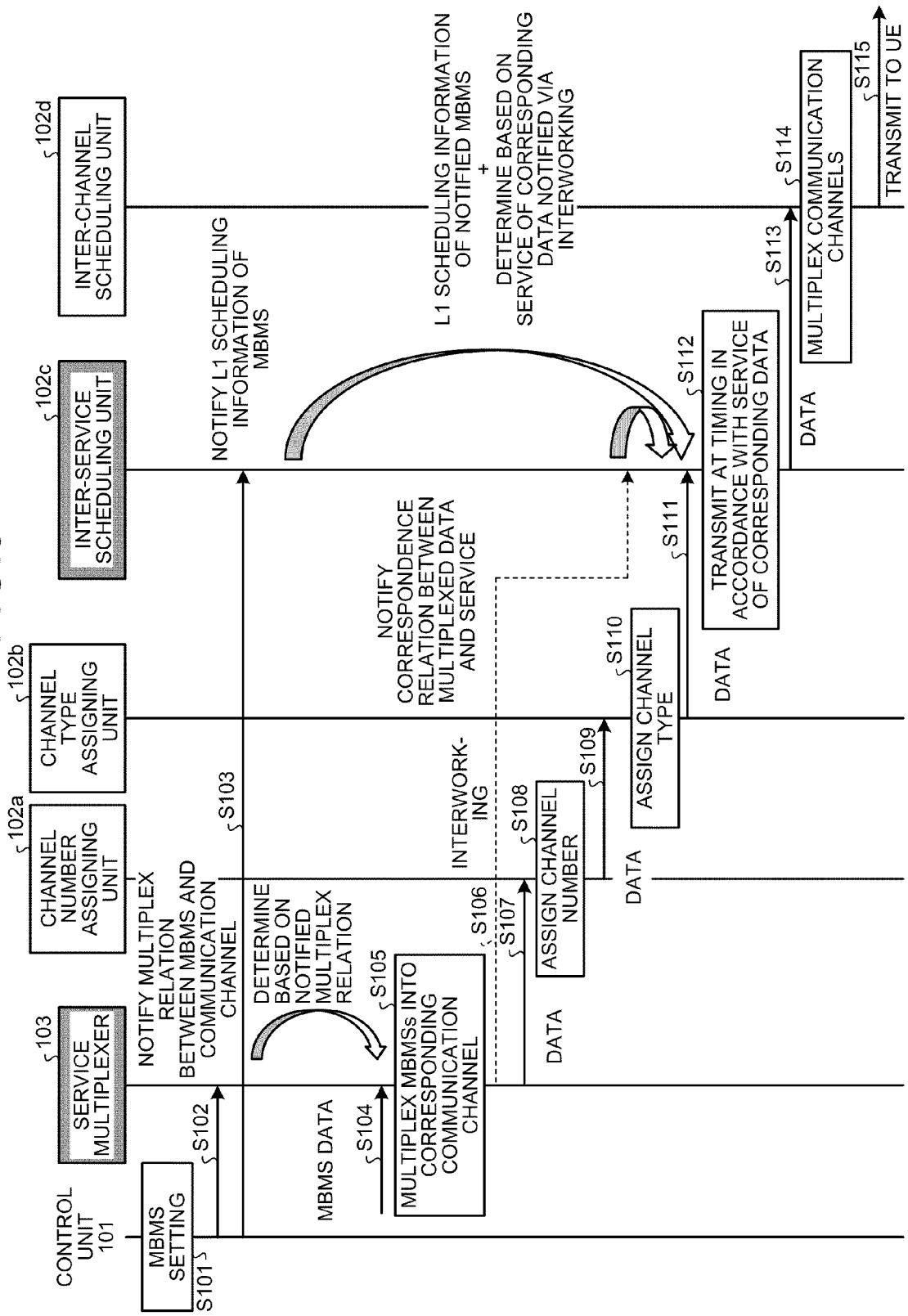
FIG. 5 is a sequence diagram of a process, performed by the radio controller in the mobile communication base station according to the first embodiment, of multiplexing MBMSs.

Next, a process of multiplexing of MBMSs performed by the radio controller in the mobile communication base station according to the first embodiment will be explained. FIG. 5 is a sequence diagram of the process.

In FIG. 5, the control unit 101 first performs an MBMS setting at step S101. Specifically, the control unit 101 determines what MBMSs are to be multiplexed into what communication channel (MTCH) (a multiplex relation between MBMSs and a communication channel) and also determines L1 scheduling information of each of the multiplexed MBMSs.

The control unit 101 then notifies the multiplex relation between the MBMSs and the communication channel determined at step S101 to the service multiplexer 103 at step S102. The control unit 101 notifies L1 scheduling information of each MBMS determined at step S101 to the inter-service scheduling unit 102c at step S103.

Next, the service multiplexer 103 receives data of MBMSs from the CN (Core Network) at step S104. The service multiplexer 103 then multiplexes the MBMS data received from the CN based on the multiplex relation between the MBMSs and the communication channel notified at step S102 by the control unit 101 at step S105.

The service multiplexer 103 then notifies a correspondence relation between each of the multiplexed MBMS data and a service via interworking to the inter-service scheduling unit 102c at step S106.

Next, the service multiplexer 103 transfers the MBMS data which are multiplexed into the communication channel at step S105 to the channel number assigning unit 102a at step S107. The channel number assigning unit 102a then assigns a channel number to the MBMS data multiplexed at step S105 to the communication channel at step S108.

Next, the channel number assigning unit 102a transfers the MBMS data to which the channel number is assigned at step S108 to the channel type assigning unit 102b at step S109. The channel type assigning unit 102b then, at step S110, assigns a channel type to the MBMS data to which the channel number is assigned at step S108.

Next, the channel type assigning unit 102b transfers the MBMS data to which the channel type is assigned at step S110 to the inter-service scheduling unit 102c at step S111

Next at step S112, the inter-service scheduling unit 102c controls to transmit the MBMS data to the inter-channel scheduling unit 102d at a timing appropriate to a service of the MBMS data based on the contents (the L1 scheduling information for each of the multiplexed MBMS data and the service corresponding to each of the MBMS data notified via interworking) notified at step S103 and S106, respectively. The inter-service scheduling unit 102c serves the MBMS data to the inter-channel scheduling unit 102d at step S113.

Next, the inter-channel scheduling unit 102d multiplexes communication channels at step S114. The inter-channel scheduling unit 102d then transmits the MBMS data to the UE at step S115.

Figure 6:
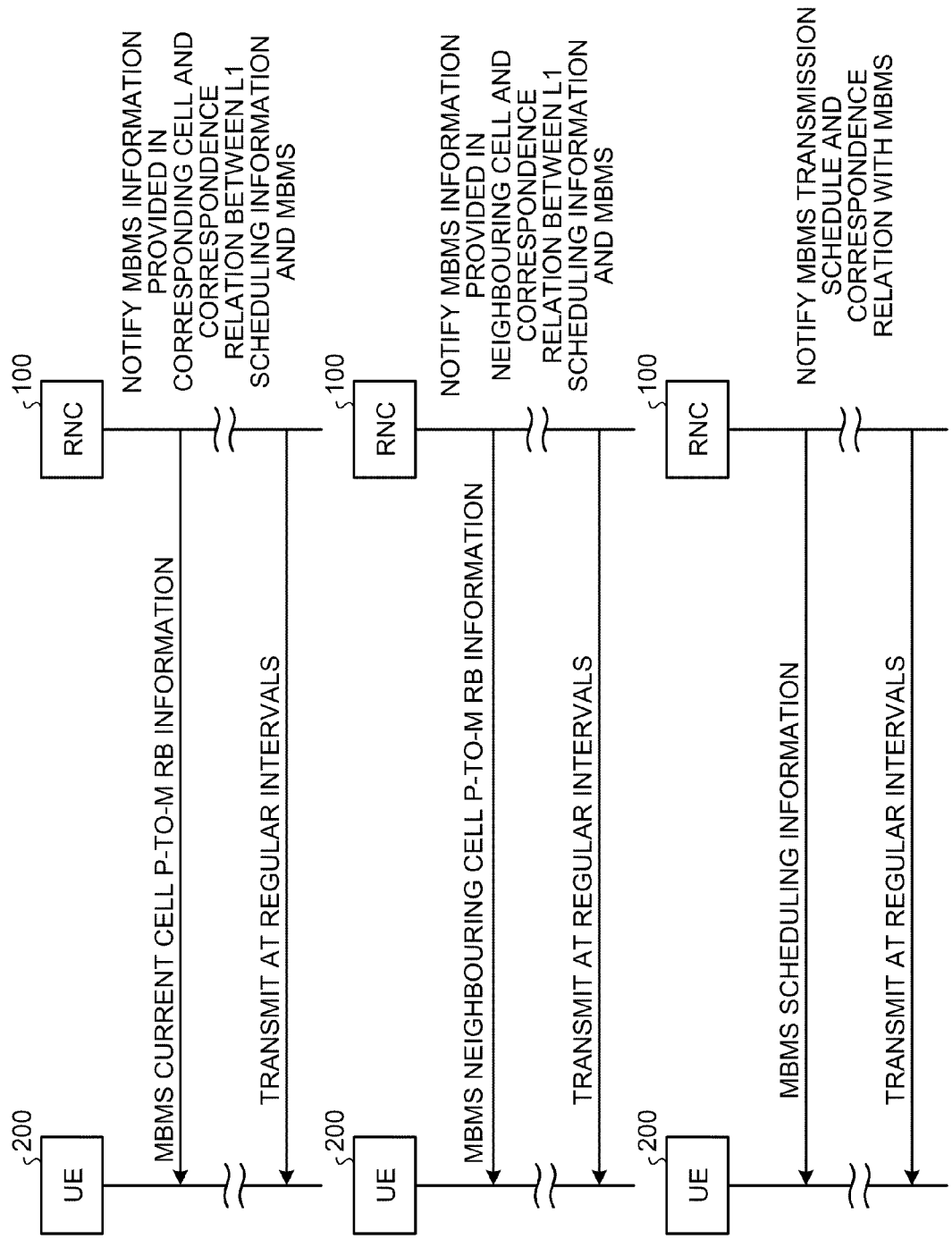
FIG. 6 is a sequence diagram of a method of notifying a relation between the L1 scheduling information and the MBMSs from the radio controller in the mobile communication base station to a mobile communication terminal apparatus according to the first embodiment.

Next, a method of notifying a relation between L1 scheduling information and an MBMS from the radio controller in the mobile communication base station to a mobile communication terminal apparatus according to the first embodiment will be explained. FIG. 6 is a sequence diagram of the notification method.

Information of an MBMS is notified by using a controlling channel from the radio controller 100 to a mobile communication terminal apparatus 200. Table 1 illustrates an example of "MBMS SCHEDULING INFORMATION" which is a notification signal from the radio controller 100 to the mobile communication terminal apparatus 200. Here in Table 1, only items related to the first embodiment will be illustrated.

TABLE 1

| INFORMATION ELEMENT | SEMANTICS DESCRIPTION |
| --- | --- |
| MESSAGE TYPE | SIGNAL TYPE |
| SERVICE SCHEDUDLING INFO LIST (LIST FOR THE NUMBER OF MBMSs) | |
| MBMS TRANSMISSION IDENTITY | MBMS ID |
| MBMS TRANSMISSIONS INFO LIST (LIST FOR SCHEDULING PART) | |
| START | FRAME OFFSET |
| DURATION | THE NUMBER OF FRAME SUCCESSION |
| MBMS LOGICAL CHANNEL IDENTITY | MBMS LOGICAL CHANNEL NUMBER (CORRESPONDING TO MBMS ID) |
| NEXT SCHEDULING PERIOD | FRAME PERIOD |

According to Table 1 above, "MBMS LOGICAL CHANNEL IDENTITY" is newly added, by extending a content of a conventional signal, under "MBMS TRANSMISSIONS INFO LIST" under "SERVICE SCHEDULING INFO LIST" of "INFORMATION ELEMENT" in the first embodiment. The "MBMS LOGICAL CHANNEL IDENTITY" is a logical channel number for MBMS and corresponds to "MBMS ID".

Table 2 illustrates an example of "MBMS CURRENT CELL P-TO-M RB INFORMATION" which is a notification signal from the radio controller 100 to the mobile communication terminal apparatus 200. Here in Table 2, only items related to the first embodiment will be illustrated.

TABLE 2

| INFORMATION ELEMENT | SEMANTICS DESCRIPTION |
| --- | --- |
| MESSAGE TYPE | SIGNAL TYPE |
| S-CCPCH LIST (LIST FOR THE NUMBER OF PHYSICAL CHs) | |
| ... | |
| TrCH INFORMATION LIST (LIST FOR THE NUMBER OF FACHs) | |
| TrCH IDENTITY | CH ID INDICATING FACH |
| RB INFORMATION LIST (LIST FOR THE NUMBER OF LOGICAL CHs) | |
| ... | |
| MBMS LOGICAL CHANEL IDENTITY | MBMS LOGICAL CHANNEL NUMBER (CORRESPONDING TO MBMS ID) |
| L1 COMBINING STATUS | IN EFFECT/NOT IN EFFECT OF L1 SCHEDULING |

TABLE 2-continued

| INFORMATION ELEMENT | SEMANTICS DESCRIPTION |
| --- | --- |
| MBMS INFORMATION LIST (LIST FOR THE NUMBER OF MBMSs MULTIPLEXED INTO CORRESPONDING MTCH) | |
| MBMS IDENTITY | MBMS IDENTIFIER (CORRESPONDING TO MBMS ID) |
| START | FRAME OFFSET |
| DURATION | THE NUMBER OF FRAME SUCCESSION |
| NEXT SCHEDULING PERIOD | FRAME PERIOD |

According to Table 2 above, "MBMS LOGICAL CHANNEL IDENTITY", "L1 COMBINING STATUS", and "MBMS INFORMATION LIST" are newly added, by extending a content of a conventional signal, under "RB INFORMATION LIST" under "TrCH INFORMATION LIST" under "S-CCPCH LIST" of "INFORMATION ELEMENT" in the first embodiment.

The "MBMS LOGICAL CHANNEL IDENTITY" is a logical channel number for MBMS and corresponds to "MBMS ID". The "L1 COMBINING STATUS" is flag information which indicates whether the L1 scheduling is in effect or not.

The "MBMS INFORMATION LIST" is a list having a repetitive structure for the number of MBMSs multiplexed into a corresponding MTCH. "MBMS IDENTITY", "START", "DURATION", and "NEXT SCHEDULING PERIOD" are present under the "MBMS INFORMATION LIST" and these items form the repetitive structure.

The "MBMS IDENTITY" is an identifier of an MBMS and corresponds to the MBMS ID. The "START" is the frame offset in performing multiplexing in radio frames. Besides, the "DURATION" is the number of frame succession in performing multiplexing in radio frames. In addition, the "NEXT SCHEDULING PERIOD" indicates the frame period.

The new addition of the above information into "MBMS SCHEDULING INFORMATION" and "MBMS CURRENT CELL P-TO-M RB INFORMATION" enables notifying L1 scheduling information and a correspondence relation between an MBMS and a communication channel. Here, the definition of the newly added signals is only one example and any signal format may be adopted as long as equivalent information is notified in a method adopted.

As illustrated in FIG. 6, the "MBMS CURRENT CELL P-TO-M RB INFORMATION" to which MBMS information provided in a corresponding cell and the correspondence relation between L1 scheduling information and the MBMS are added is transmitted at regular intervals from the radio controller (RNC) 100 to the mobile communication terminal apparatus (UE) 200 in the first embodiment.

Similarly, "MBMS NEIGHBOURING CELL P-TO-M RB INFORMATION" to which MBMS information provided in a neighbouring cell and the correspondence relation between L1 scheduling information and the MBMS are added is transmitted at regular intervals from the radio controller (RNC) 100 to the mobile communication terminal apparatus (UE) 200 as illustrated in FIG. 6 in the first embodiment.

Here, a signal format of the "MBMS NEIGHBOURING CELL P-TO-M RB INFORMATION" is configured such that the "MESSAGE TYPE" of the signal format of the "MBMS CURRENT CELL P-TO-M RB INFORMATION" is "SIGNAL TYPE INDICATING NEIGHBOURING CELL MBMS INFORMATION".

Similarly, "MBMS SCHEDULING INFORMATION" to which a transmission schedule of the MBMS and a correspondence relation with the MBMS are added is transmitted at regular intervals from the radio controller (RNC) 100 to the mobile communication terminal apparatus (UE) 200 as illustrated in FIG. 6 in the first embodiment.

Figure 7:
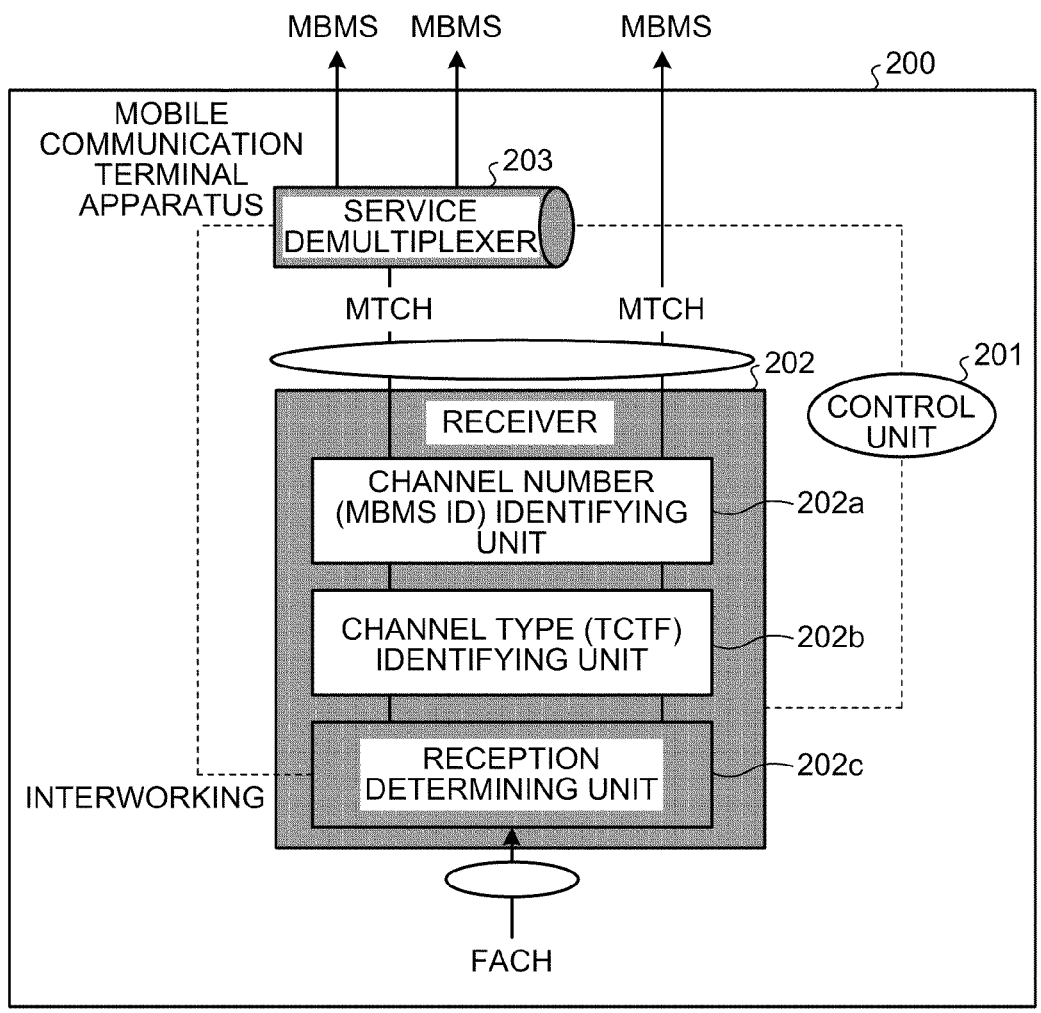
FIG. 7 is a functional block diagram of a configuration of the mobile communication terminal apparatus according to the first embodiment.

A configuration of the mobile communication terminal apparatus according to the first embodiment will be explained next. FIG. 7 is a functional block diagram of the configuration. Here in FIG. 7, configurations and functions of only parts related to the first embodiment will be explained.

As illustrated in FIG. 7, the mobile communication terminal apparatus (UE) 200 according to the first embodiment is provided with a control unit 201, a receiver 202, and a service demultiplexer 203. The control unit 201 performs controls of other functional units, such as setting and releasing a communication channel for MBMS upon a start and an end of an MBMS.

In the first embodiment, the control unit 201 notifies L1 scheduling information of each MBMS and the multiplex relation between a communication channel and an MBMS received from the radio controller 100 to other functional blocks and controls a separation of multiplexed MBMSs.

The receiver 202 is provided with a channel number (MBMS ID) identifying unit 202a, a channel type (TCTF) identifying unit 202b, and a reception determining unit 202c. The channel number identifying unit 202a and the channel type identifying unit 202b respectively separates the channel number (MBMS ID) and the channel type (TCTF) which are assigned to MBMS data according to a protocol format of each MBMS technology.

The channel number identifying unit 202a and the channel type identifying unit 202b each have an equivalent function to the conventional technique. In the first embodiment, a function of cooperating with the service demultiplexer 203 is newly added to the receiver 202. A functional block for the added is the reception determining unit 202c.

The reception determining unit 202c allows the service demultiplexer 203 to determine what MBMS data the received data is by notifying a radio frame timing of the received data to the service demultiplexer 203.

The service demultiplexer 203 performs a separation of MBMS data from the communication channel according to the correspondence relation between each MBMS and the communication channel instructed by the control unit 201. On this occasion, the service demultiplexer 203 determines what MBMS data the received MBMS data after multiplex is in cooperation with the receiver 202 based on the received radio frame timing and L1 scheduling information of each MBMS.

Here, when a plurality of MBMSs are multiplexed into one communication channel, an intermittent reception process of the mobile communication terminal apparatus 200 can be improved. In a case of selecting and utilizing any of multiplexed MBMSs, it is not necessary to receive, like the conventional way, all the MBMS data of the corresponding communication channel.

The intermittent reception process indicates a process of receiving only a radio frame in which target MBMS data for utilization is stored without receiving other radio frames in which other MBMS data are present based on L1 scheduling information of the utilization target MBMS. This process allows reducing an electric power consumption of the mobile communication terminal apparatus 200.

Figure 8:
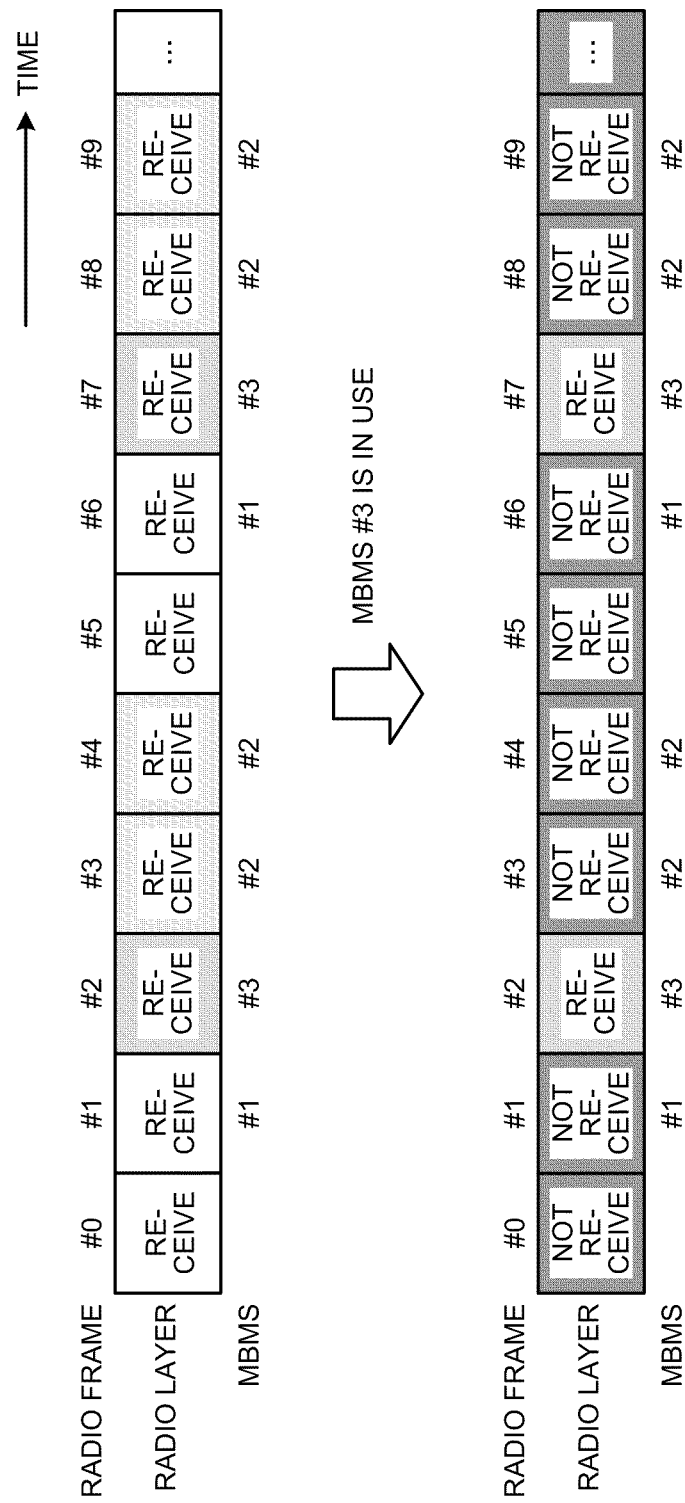
FIG. 8 is a view for explaining a method of receiving MBMSs multiplexed into one communication channel by the L1 scheduling performed in the mobile communication terminal apparatus according to the first embodiment.

Specifically, the data of the MBMS #1 is stored in a radio frame having a frame number expressed in a form of "#(5n+1) (n=0, 1, . . . )" as illustrated in FIG. 8. Besides, the data of the MBMS #2 is stored in a radio frame having a frame number expressed in a form of "#(5n+3, 4) (n=0, 1, . . . )". Besides, the data of the MBMS #3 is stored in a radio frame having a frame number expressed in the form of "#(5n+2) (n=0, 1, . . . )".

Then, a user of the mobile communication terminal apparatus 200 makes use by selecting one MBMS. In fact, receiving data of all MBMSs means receiving data of MBMSs which the user of the mobile communication terminal apparatus 200 does not use, which causes a useless consumption of a battery of the mobile communication terminal apparatus 200.

In response, the mobile communication terminal apparatus 200 is, for example when the user of the mobile communication terminal apparatus 200 makes use by selecting the MBMS #3 as illustrated in FIG. 8, configured to receive only the radio frame "#(5n+2) (n=0, 1 . . . )" storing the data of the MBMS #3, so that a consumption of the battery of the mobile communication terminal apparatus 200 can be reduced.

Figure 9:
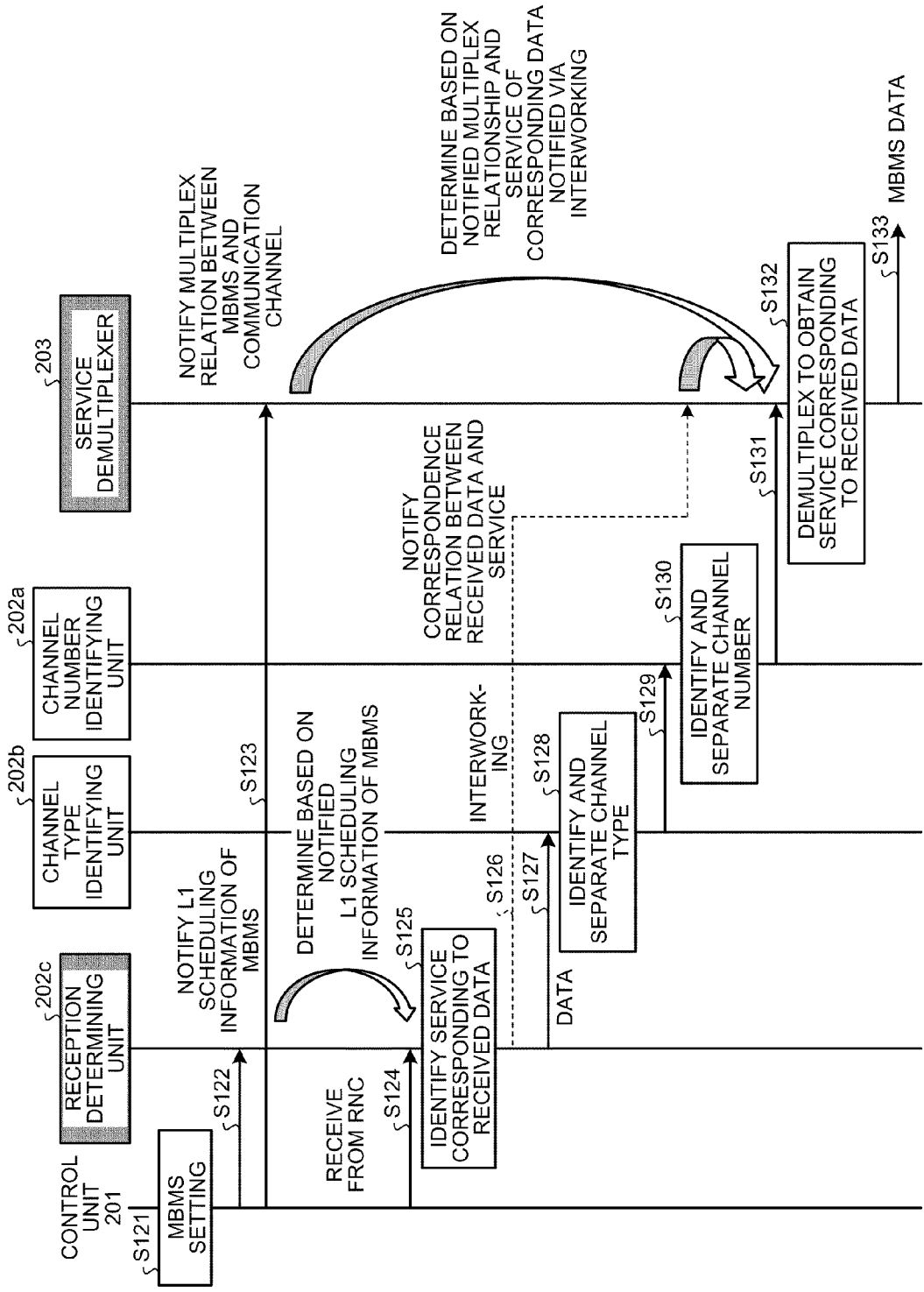
FIG. 9 is a sequence diagram of a process, performed in the mobile communication terminal apparatus according to the first embodiment, of separating MBMSs.

Next, a process, performed in the mobile communication terminal apparatus according to the first embodiment, of separating MBMSs will be explained. FIG. 9 is a sequence diagram of the process.

In FIG. 9, the control unit 201 first performs an MBMS setting at step S121. Specifically, the control unit 201 sets and keeps L1 scheduling information of each MBMS and the multiplex relation between an MBMS and a communication channel notified from the radio controller 100.

The control unit 201 then notifies L1 scheduling information of each MBMS set and kept at step S121 to the reception determining unit 202c at step S122. Besides, the control unit 201 notifies the multiplex relation between an MBMS and a communication channel to the service demultiplexer 203 at step S123.

Next, the control unit 201 transfers MBMS data received from the radio controller (RNC) 100 to the reception determining unit 202c at step S124. The reception determining unit 202c which received the MBMS data identifies, at step S125, each MBMS corresponding to each of the received data (MBMS data) based on the L1 scheduling information notified at step S122.

The reception determining unit 202c then notifies the correspondence relation with the received MBMS data via interworking to the service demultiplexer 203 at step S126. In addition the reception determining unit 202c transfers the received MBMS data to the channel type identifying unit 202b at step S127.

Next, the channel type identifying unit 202b identifies and separates a channel type from the MBMS data transferred from the reception determining unit 202c at step S128. The channel type identifying unit 202b then transfers the MBMS data transferred from the reception determining unit 202c together with the identified channel type to the channel number identifying unit 202a at step S129.

Next, the channel number identifying unit 202a identifies and separates a channel number from the MBMS data transferred from the channel type identifying unit 202b at step S130. The channel number identifying unit 202a then transfers the MBMS data transferred from the channel type identifying unit 202b together with the identified channel type and channel number to the service demultiplexer 203 at step 131.

Next at step S132, the service demultiplexer 203 demultiplexes the received MBMS data to obtain a corresponding MBMS based on the multiplex relation between the MBMS and the communication channel notified at step S123, on the relation between the MBMS data and the MBMS notified at step S126, and on the channel type and channel number transferred at step S131. The service demultiplexer 203 then outputs the demultiplexed MBMS data at step S133.

[b] Second Embodiment

Figure 10:
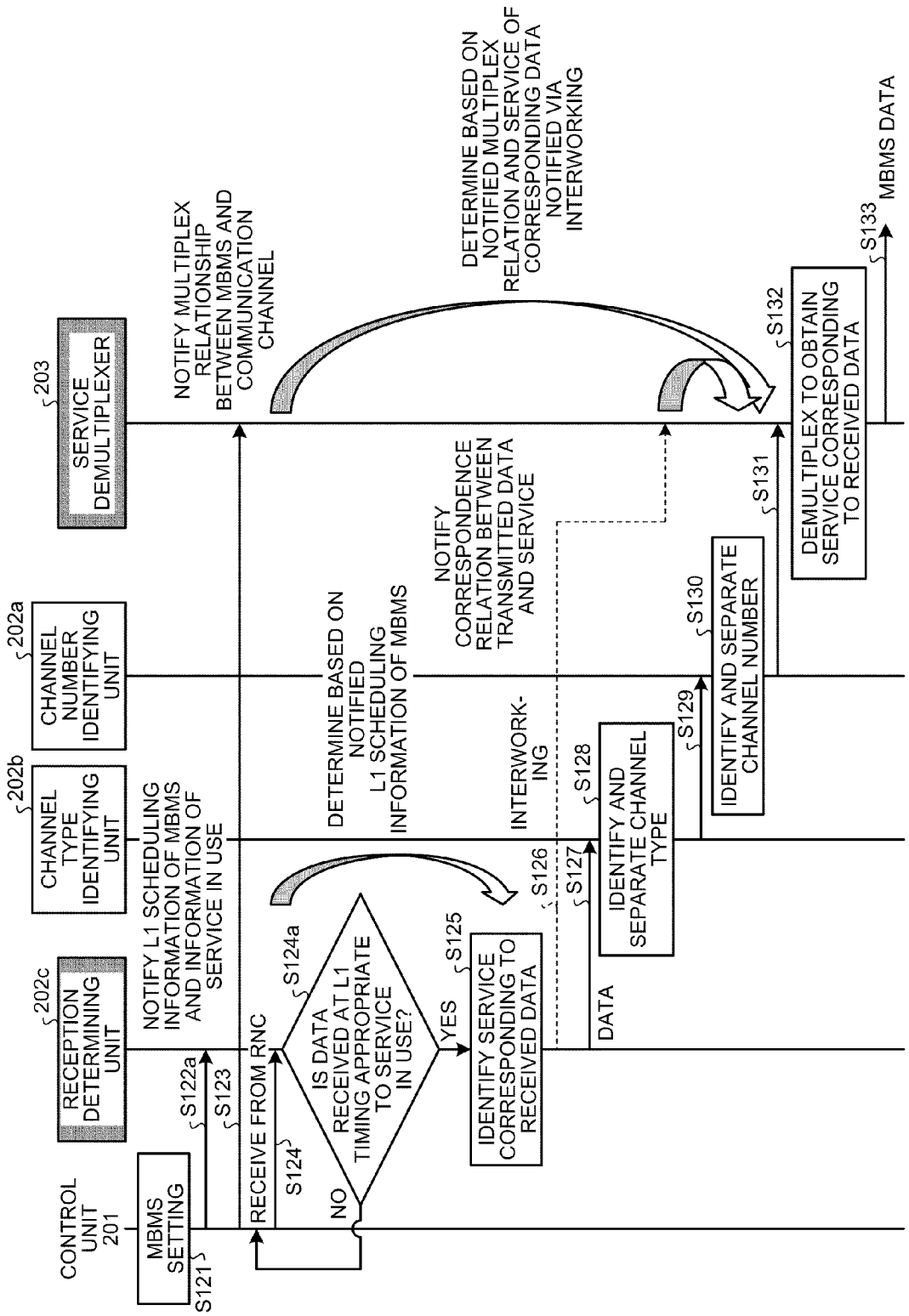
FIG. 10 is a sequence diagram of a process, performed in a mobile communication terminal apparatus according to a second embodiment, of separating MBMSs.

Next, a process, performed in a mobile communication terminal apparatus according to a second embodiment, of separating MBMSs will be explained. FIG. 10 is a sequence diagram of the process. The MBMS separating process illustrated in FIG. 10 includes the intermittent reception process explained with reference to FIG. 8 and may be performed instead of the MBMS separating process illustrated in FIG. 9.

Here in FIG. 10, a functional block and a process respectively denoted by the same reference character and the same step number are the same as those illustrated in FIG. 9. The differences in FIG. 10 are step S122a to be performed instead of step S122 and step S124a to be performed between steps S124 and S125.

At step S122a, the control unit 201 notifies L1 scheduling information of an MBMS and information of the service in use to the reception determining unit 202c at step S122a. The reception determining unit 202c then determines, at step S124a, whether or not the MBMS data received at step S124 is received at a timing appropriate to the service in use based on the information of the service in use notified at step S122a.

When the MBMS data received at step S124 is determined to have been received at an L1 timing for the service in use ("Yes" at step S124a), the process moves to step S125 and when the received MBMS data is determined not to have been received at the L1 timing for the service in use ("No" at step S124a), the process moves to step S124.

While the embodiments of the invention are explained above, the invention is not limited thereto and may be realized in various different forms without departing from the spirit and scope of the technical concept described in the appended claims. In addition, the advantages of the invention are not limited to those described in the embodiments.

Besides, all or a part of the processes explained in the embodiments as being performed automatically can be performed manually, or all or a part of the processes explained as being performed manually can be performed automatically in a known method. Furthermore, a process procedure, a control procedure, a specific name, and information including various data and parameters described in the embodiments can be arbitrarily modified unless otherwise specified.

Constituents of each device illustrated are only exemplary and explanatory on a functional and conceptual basis, and are not necessarily required to be configured physically as illustrated. In other words, a specific disintegration/integration of each device is not limited to the illustrated modes and all or a part thereof can be configured by functionally or physically applying disintegration/integration in a given unit according to load of various kinds, a status of use, and the like.

Moreover, all or a part of each processing function performed by each device may be realized by a central processing unit (or a micro computer such as a micro processing unit and a micro controller unit) and a program analyzed and executed by the central processing unit (the micro computer such as a micro processing unit and a micro controller unit), or may be realized as a hardware of a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mobile communication system, comprising:
    a data multiplexer that divides by time a radio frame of a Multimedia Broadcast and Multicast Service 'MBMS' communication channel in a radio layer and multiplexes one of a plurality of pieces of multicast data or a plurality of pieces of broadcast data into the divided radio frames; and
    a data demultiplexer that demultiplexes the received multiplexed data upon receiving one of the plurality of pieces of multicast data or the plurality of pieces of broadcast data multiplexed by the data multiplexer.

2. The mobile communication system according to claim 1, further comprising:
    a communication channel determining unit that determines into what communication channel the plurality of pieces of multicast data or the plurality of pieces of broadcast data are multiplexed;
    a schedule determining unit that determines a schedule of the data multiplexing into the MBMS communication channel determined by the communication channel determining unit;
    a service identifying information assigning unit that assigns identifying information of a corresponding service to the plurality of pieces of multicast data or the plurality of pieces of broadcast data multiplexed by the data multiplexer based on the schedule of the data multiplexing determined by the schedule determining unit;
    a communication channel identifying information assigning unit that assigns identifying information of the MBMS communication channel determined by the communication channel determining unit to the plurality of pieces of multicast data or the plurality of pieces of broadcast data multiplexed by the data multiplexer; and
    a data multiplexing process controller that controls a process, performed by the data multiplexer, of multiplexing the plurality of pieces of multicast data or the plurality of pieces of broadcast data based on the corresponding schedule.

3. The mobile communication system according to claim 2, wherein the data multiplexer includes a notifying unit that notifies the identifying information of the service corresponding to the plurality of pieces of multicast data or the plurality of pieces of broadcast data, the identifying information of the MBMS communication channel determined by the communication channel determining unit, and the schedule information to the data multiplex demultiplexer.

4. The mobile communication system according to claim 3, further comprising:
    a service determination notifying unit that notifies, after determining a service of the plurality of pieces of multicast data or the plurality of pieces of broadcast data multiplexed by the data multiplexer based on the schedule information notified by the notifying unit, the determined service to the data demultiplexer;
    a service identifying unit that identifies a corresponding service based on the identifying information, notified by the notifying unit, of the service corresponding to the plurality of pieces of multicast data or the plurality of pieces of broadcast data; and
    a communication channel identifying unit that identifies a corresponding MBMS communication channel based on the identifying information, notified by the notifying unit, of the MBMS communication channel determined by the communication channel determining unit, wherein
    the data demultiplexer demultiplexes the plurality of pieces of multicast data or the plurality of pieces of broadcast data based on a result of the service identification by the service identifying unit and on a result of the MBMS communication channel identification by the communication channel identifying unit.

5. The mobile communication system according to claim 1, wherein the data multiplex demultiplexer receives identifying information corresponding to the plurality of pieces of multicast data or the plurality of pieces of broadcast data multiplexed by the data multiplexer into the MBMS communication channel via time division and time division scheduling information in the radio layer corresponding to the service, and selects and receives only a radio frame in which the multicast data or the broadcast data to be used is stored based on the received information.

6. A mobile communication method, comprising:
    multiplexing, after dividing by time a radio frame of a Multimedia Broadcast and Multicast Service 'MBMS' communication channel in a radio layer, a plurality of pieces of multicast data or a plurality of pieces of broadcast data into the divided radio frames; and
    demultiplexing the received multiplexed data upon receiving the plurality of pieces of multicast data or the plurality of pieces of broadcast data multiplexed at the multiplexing.

7. The mobile communication method according to claim 6, further comprising:
    determining into what communication channel are the plurality of pieces of multicast data or the plurality of pieces of broadcast data multiplexed;
    determining a schedule of the data multiplexing into the MBMS communication channel determined at the determining;
    assigning identifying information of a corresponding service to the plurality of pieces of multicast data or the plurality of pieces of broadcast data multiplexed at the multiplexing based on the schedule of the data multiplexing determined at the determining;
    assigning identifying information of the MBMS communication channel determined at the determining to the plurality of pieces of multicast data or the plurality of pieces of broadcast data multiplexed at the multiplexing; and
    controlling a process of multiplexing the plurality of pieces of multicast data or the plurality of pieces of broadcast data in the multiplexing based on the corresponding schedule.

8. The mobile communication method according to claim 7, wherein the multiplexing includes notifying the identifying information of the service corresponding to the plurality of pieces of multicast data or the plurality of pieces of broadcast data, the identifying information of the MBMS communication channel determined at the determining, and the schedule information to the demultiplexing.

9. The mobile communication method according to claim 8, further comprising:
    notifying, after determining a service of the plurality of pieces of multicast data or the plurality of pieces of broadcast data multiplexed at the multiplexing based on the schedule information notified at the notifying, the determined service;

identifying a corresponding service based on the identifying information, notified at the notifying of the determined service, of the service corresponding to the plurality of pieces of multicast data or the plurality of pieces of broadcast data; and identifying a corresponding MBMS communication channel based on the identifying information, notified in the notifying of the determined service, of the MBMS communication channel determined at the determining, wherein the demultiplexing includes demultiplexing the plurality of pieces of multicast data or the plurality of pieces of broadcast data based on a result of the service identification at the identifying and on a result of the MBMS communication channel identification at the identifying the MBMS communication channel.

10. The mobile communication method according to claim 6, wherein the demultiplexing includes receiving identifying information corresponding to the plurality of pieces of multicast data or the plurality of pieces of broadcast data multiplexed into the MBMS communication channel via time division and time division scheduling information in the radio layer corresponding to the service; and selecting and receiving only a radio frame in which the multicast data or the broadcast data to be used is stored, based on the received information.

11. A mobile communication base station apparatus, comprising:

a service identifying information assigning unit that assigns identifying information of a corresponding service to a plurality of pieces of multicast data or a plurality of pieces of broadcast data;

a communication channel identifying information assigning unit that assigns identifying information of a Multimedia Broadcast and Multicast Service 'MBMS' communication channel to the plurality of pieces of multicast data or the plurality of pieces of broadcast data;

a data multiplexer that divides by time a radio frame of the MBMS communication channel in a radio layer and multiplexes the plurality of pieces of multicast data or the plurality of pieces of broadcast data into the divided radio frames; and a transmitter that transmits the plurality of pieces of multicast data or the plurality of pieces of broadcast data multiplexed by the data multiplexer to a mobile communication terminal apparatus.

12. The mobile communication base station apparatus according to claim 11, wherein the data multiplexer includes a notifying unit that notifies the identifying information of the service corresponding to the plurality of pieces of multicast data or the plurality of pieces of broadcast data, the identifying information of the MBMS communication channel to the transmitter.

13. A mobile communication terminal apparatus, comprising:

a service identifying unit that identifies a corresponding service based on identifying information, notified from a mobile communication base station apparatus, of the service corresponding to the plurality of pieces of multicast data or the plurality of pieces of broadcast data;

a communication channel identifying unit that identifies a corresponding Multimedia Broadcast and Multicast Service 'MBMS' communication channel based on identifying information, notified from the mobile communication base station apparatus, of the communication channel corresponding to the plurality of pieces of multicast data or the plurality of pieces of broadcast data; and a data demultiplexer that demultiplexes the plurality of pieces of multicast data or the plurality of pieces of broadcast data based on a result of the service identification by the service identifying unit and on a result of the MBMS communication channel identification by the communication channel identifying unit.

14. The mobile communication terminal apparatus according to claim 13, wherein the data demultiplexer receives, from the mobile communication base station apparatus, identifying information corresponding to the plurality of pieces of multicast data or the plurality of pieces of broadcast data multiplexed into the MBMS communication channel via time division and time division scheduling information corresponding to the service in a radio layer, and selects and receives only a radio frame in which the multicast data or the broadcast data to be used is stored, based on the received information.

* * * * *